United States Patent Office 3,813,434
Patented May 28, 1974

3,813,434
PREPARATION OF PURE GLYCINE
Nelson S. Marans, Silver Spring, Md., assignor to W. R. Grace & Co., New York, N.Y.
No Drawing. Filed June 6, 1972, Ser. No. 260,164
Int. Cl. C07c 99/12
U.S. Cl. 260—534 E     9 Claims

ABSTRACT OF THE DISCLOSURE

In the preparation of glycine from ammonia and glycolonitrile, the recovery of the pure glycine product free of contamination with iminodiacetic acid is accomplished by ion exchanging an aqueous solution containing a mixture of glycine and iminodiacetic acid, using an anion exchange resin. Thus, glycine is separated and recovered while the iminodiacetic acid impurity is retained by the basic ion exchange resin. The iminodiacetic acid may then be recovered by use of an acid having an ionization constant greater than $1 \times 10^{-3}$.

BACKGROUND OF THE INVENTION

This invention relates to a process for preparing pure amino carboxylic acid compounds. In particular, it relates to the preparation of pure glycine.

There are several known methods for preparing amino carboxylic acids such as glycine known in the art. A favorable known synthesis route to glycine is a cyanomethylation process. According to this process, glycinonitrile ($H_2NCH_2CN$) is formed by the reaction of ammonia and glycolonitrile ($HOCH_2CN$) or a mixture of formaldehyde and hydrogen cyanide. Alkaline saponification of this reaction mixture yields the sodium glycinate salt which is converted to glycine upon the removal of the sodium ion, e.g., by acidification. This reaction sequence for preparing glycine may be illustrated by the following equations:

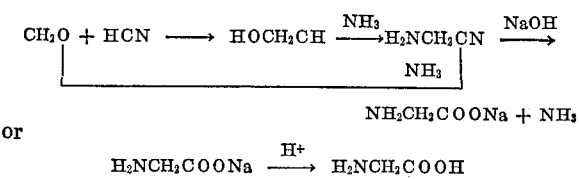

or
$$H_2NCH_2COONa \xrightarrow{H^+} H_2NCH_2COOH$$

Via this synthesis route, competitive side reactions occur producing iminodiacetonitrile during the cyanomethylation of ammonia, which is subsequently saponified to disodium iminodiacetate; or the latter disodium salt is formed during the alkaline hydrolysis of the mixture containing glycinonitrile, ammonia and residual glycolonitrile (or formaldehyde/hydrogen cyanide). In the subsequent acidification steps, the disodium iminodiacetate is converted to iminodiacetic acid or monosodium iminodiacetate, depending on the pH.

In cases when other known methods used for preparing glycine, e.g., the ammoniation of chloroacetic acid, glycine, products are formed which also have various amounts of iminodiacetic acid impurities. Thus, iminodiacetic acid (IDA) is an undesirable contaminant of the glycine product. In certain uses of glycine (e.g., in foods, drugs, animal feeds, etc.), the presence of the IDA impurity is unacceptable.

Even though the amount of iminodiacetonitrile product can be somewhat diminished by using excess molar ratios of ammonia to glycolonitrile or formaldehyde/hydrogen cyanide, it has been found that generally from 5 to 10 percent iminodiacetonitrile is produced and, after subsequent conversion steps, contaminates the glycine product in the form of 5 to 10 percent iminodiacetic acid or its mono alkali salts.

The IDA impurity does not separate readily, and it has been difficult to prepare pure glycine, particularly by the cyanomethylation reaction, economically. Generally, prior art methods involved various tedious selective crystallization or solvent extraction techniques.

In accordance with this invention, pure glycine, free of iminodiacetic acid or monosodium iminodiacetate contaminants, may be prepared economically. Furthermore, this invention provides a method of isolating and recovering the iminodiacetic acid impurity. It has been found that glycine having a purity of 99.5 percent and greater has been prepared according to the process of this invention.

In accordance with this invention, glycine solutions containing iminodiacetic acid impurities have been purified by an ion exchange process. Broadly, the process comprises treating an aqueous solution containing mixture comprising glycine, its alkali metal salts or mixtures thereof, and iminodiacetic acid, its alkali metal salts or mixtures thereof, as impurities, with an anion exchange resin which retains the iminodiacetic acid component, thereby leaving a purified glycine solution. After separating the purified glycine containing solution from the anion exchange resin, the solvent is removed and a pure glycine product is recovered.

As used herein, the term "glycine component" or "iminodiacetic acid (IDA) component" refers to glycine in the acid form or alkali metal salt form; or iminodiacetic acid in the acid form or alkali metal salt form, respectively.

As used herein, the term "glycine" refers to glycine in the acid form which is either the $H_2NCH_2COOH$ structure or the zwitterion structure, $^+NH_3CH_2COO^-$.

The anion exchange (i.e., basic ion exchange) resin used in the purification process is preferably a strongly basic resin in the chloride ($Cl^-$) form. This $Cl^-$ form is the more stable form, and permits long term reuse without decomposition of the resin.

Operable anion exchange resins are those having $pK_b$ value of <5. Generally, it is desirable that these anion exchange resins have a maximum through put efficiency, i.e., possess a relatively large particle size, have a high degree of porosity and a rigid structure. Anion exchange resins having particle sizes in the range of 16 to 50 mesh (U.S. standard screen size) and wet volume capacities in the range of 1.0 to 6.0 meq./ml., preferably 1.35 to 5 meq./ml., are well known in the art and commercially available. Particularly suitable are the strongly basic ion exchange resins having a quaternary ammonium functionality and generally based on a styrene divinylbenzene copolymer matrix. Non-limiting examples of commercially available quaternary ammonium type ion exchange resins include macroreticular type such as Amberlite IRA–900, Amberlite IRA–910 or "gel" type, such as Amberlite IRA–400, Amberlite IRA–402, Amberlite IRA–410 or Amberlite IRA–458 (an acrylic-divinyl benzene based resin). Other highly suitable strongly basic resins incorporating quaternary ammonium functionality include commercially available Dowex resins, such as Dowex 1, Dowex 2, Dowex 11, Dowex 21K and Dowex SAR.

Particularly suitable are resins having a relatively high degree of crosslinkage, e.g., from 2 to 8 percent crosslinking agent such as divinylbenzene. Highly satisfactory resins are Dowex 1 (or 2) –X8, i.e., containing 8 percent divinylbenzene crosslinking agent.

Although the basic ion exchange resin is operable in any known or commercially available salt form, e.g., sulfate, chloride, etc., the chloride form is preferred. It is to be noted that these strongly basic ion exchange resins should be in the salt form, e.g., chloride form, in order to separate the glycine components from the IDA components, since the amino acids would be both retained on the ion exchange resin sites if the resin is used in its hydroxide form. Generally, the strongly basic ion exchange resins are commercially available in the chloride form, however, quaternary ammonium anion exchange resins in the hydroxide form can be readily converted to the chloride form by treating with a chloride solution such as NaCl.

Weakly basic anion exchange resins are operable as well, although the efficiency of these resins is less than that of the strongly basic resins. Weakly basic resins generally have a polyamine functionality and are based on a styrene-divinylbenzene or acrylic-divinylbenzene copolymer matrix. However, condensates having a polyamine functionality such as Dowex 4 (built on a condensed eqi-amine backbone) are operable as well. Other non-limiting examples of operable weakly basic anion exchange resins include Dowex 3, Amberlite IRA-93, Amberlite IRA-68, etc. These weakly basic, ion exchange resins are usually available in the free base form (i.e., tertiary amine) and since they are not highly ionized, may be utilized directly as such in separating the glycine from IDA impurities.

Various mixtures containing glycine or its alkali metal salts and iminodiacetic acid or its alkali metal salts, e.g., mixtures of sodium glycinate and disodium iminodiacetate; or mixtures of glycine, sodium glycinate and monosodium iminodiacetate, can be separated using the basic ion exchange resins. However, the preferred forms of the two amino carboxylic acid components are mixtures of glycine and iminodiacetic acid or glycine and monosodium iminodiacetate, since any $Na^+$ ion in the system will form NaCl with the $Cl^-$ ion of the resin and diminish the selectivity of the separation.

It is to be noted that in order to have efficient separation and purification, no soluble inorganic salts, e.g., NaCl or $Na_2SO_4$, be present in the mixtures containing glycine and IDA. The presence of sodium chloride is particularly undesirable since, when the solution containing the salt comes in contact with the basic anion exchange resin used in the separation step, simultaneous regeneration of the anion exchange resin occurs, thus preventing effective separation of the glycine component. Thus, when glycine is prepared according to the cyanomethylation route. It is necessary to remove the metal salt by-product formed upon acidification of the glycinate salt. This removal can be done by conventional methods such as fractional crystallization or use of other bases, e.g., barium hydroxide in place of sodium hydroxide which, upon acidification of the glycinate with a suitable acid, e.g., $H_2SO_4$, will form an insoluble salt which can be easily separated from the glycine and IDA mixture.

The purification process is easily carried out by passing an aqueous solution containing the glycine and iminodiacetate components through a suitable basic ion exchange column. However, the basic ion exchange resin need not necessarily be used as a column, but may also be slurried with the aqueous solution to remove the iminodiacetic acid component. Thus, the anion exchange resin and the glycine-IDA aqueous solution may be slurried at temperatures from about 25° to 100° C. for a period ranging from about 0.01 to 4 hours. Thereafter, the anion exchange resin may be removed by filtration and the glycine can be recovered in a pure form.

During the separation step, the iminodiacetic acid component impurity is retained on the basic ion exchange resin and the aqueous solution containing the glycine is obtained. The purified glycine may be recovered by any suitable means, e.g., evaporation, spray drying, etc., of the thus formed aqueous solution. Satisfactory means for evaporation include vacuum, air, low heat, etc.

If desired, the iminodiacetic acid impurity retained on the anion exchange resin may also be isolated and recovered in a pure form. Any conventional method, e.g., steaming, etc., can be utilized to remove the IDA component, but the preferred method of removing the iminodiacetic acid or its salts retained on the resin sites is by treating the resin with a solution containing sodium chloride. The washing of the resin with a NaCl solution also regenerates the ion exchange resin, thus permitting the use of the resin for separation of a new mixture of glycine and IDA components.

With the sodium chloride wash, the IDA component is converted to the sodium salt derivative of iminodiacetic acid. Upon subsequent acidification with an acid having an ionization constant greater than $1 \times 10^{-3}$, e.g., with $H_2SO_4$ or HCl, the latter IDA salt is converted to the iminodiacetic acid form. The IDA may be recovered from the aqueous solution by aforedescribed conventional methods, e.g., by evaporation.

Although various concentrations of the glycine and IDA components may be utilized, the most economical separation is accomplished by operating at concentrations near the limit of the solubilities of the various components in order to produce the volume of liquid to be handled and evaporated in the system. Care must be taken, however, not to overload the column, since efficiency of separation will decrease. Thus, aqueous solutions containing up to 15 percent by weight of mixtures of the glycine components and IDA components are operable. Satisfactory results have been obtained using aqueous solutions having from 1 to 15 percent by weight and preferably from 1 to 5 percent on the same basis.

It is to be noted that although throughout the invention the iminodiacetic acid component has been referred to as an impurity, since in cases where glycine is the major product, IDA is present in small amounts, the subject separation method is operable for mixtures containing various ratios of glycine and IDA components. Thus, the IDA component may be present in amounts greater than the glycine component and in instances where it is desired, the iminodiacetic acid can be isolated and recovered as a major by-product.

The following examples are given to further illustrate the present invention. In all cases, unless otherwise noted, all parts and percentages are by weight.

Example 1

A glass column 18 inches long and 1.5 inches in diameter, equipped with a stopcock attachment, was packed first with Pyrex wool, then 100 g. of a strongly basic anion exchange resin, commercially available from Dow Chemical Co. under the trade name Dowex 2X8, and finally with sea sand. This strongly basic anion exchange resin, a diethanolamine substituted polystyrenedivinyl benzene copolymer resin in the chloride form, had a wet volume exchange capacity of 1.4 meq./ml., a dry capacity of 3.3 meq./q. and a particle size of 20–40 mesh (wet). The resin column was prewashed with 100 ml. of deionized water, and eluant was discarded. Thereafter, 100 ml. of a 1 percent aqueous solution of a 90:10 mixture of glycine acid/iminodiacetic acid, respectively, was passed slowly over the resin column. The resin column was then washed with two successive portions, 100 ml. each, of distilled water. The first 200 ml. eluted fraction was collected and, after being evaporated to dryness in an oven at 60° C. and 5 inches Hg pressure, gave 0.85 g. of a solid product. A N.M.R. analysis of the solid using deuterated water ($D_2O$) as the solvent showed the product to be pure glycine free of iminodiacetic acid impurity.

Example 2

A column containing the aforedescribed Dowex 2X8 basic ion exchange resin was prepared in the same manner as in Example 1. The resin column was washed with 100 ml. of distilled water, and after discarding the eluted water, a 100 ml. aqueous solution containing 0.90 g. of glycine and 0.10 g. of the monosodium salt of iminodiacetic acid was passed slowly over the resin column. The resin column was then washed with 3 successive 100 ml. portions of distilled water. The total eluant, 400 ml., was evaporated to dryness in a vacuum oven at 60° C. and 5 inches Hg pressure, giving 0.89 g. of solid. A N.M.R. analysis of the solid in $D_2O$ showed the product to be about 99.5+ percent pure glycine, which did not contain any iminodiacetic acid.

Example 3

Example 2 was repeated except that 100 ml. solution containing 0.90 g. of sodium glycinate and 0.10 g. of disodium iminodiacetate was utilized instead of the glycine/monosodium iminodiacetate. After evaporation to dryness, 0.84 g. of glycine (93 percent recovery) was recovered and was shown by N.M.R. analysis to be about 98+ percent pure glycine.

Example 4

This example illustrates a method of purifying glycine by using the ion exchange resin as a slurry.

To 100 ml. of a 5 percent aqueous solution containing a 90:10 mixture of glycine acid/iminodiacetic acid respectively, was added 50 g. of wet Dowex 2X8, the strongly basic ion exchange resin described in Example 1. The solution was stirred for 2 hours at a temperature of about 70° C. Thereafter, the resin was removed by filtration and filtrate was evaporated to dryness to give a solid product which was shown by N.M.R. analysis to be about 99+ percent pure glycine.

Example 5

Example 1 was repeated except that in place of the basic Dowex 2X8 resin, a strongly acidic ion exchange resin, commercially available under the trade name Dowex 50W-X4, was used. No separation of the glycine and IDA mixture was obtained.

Example 6

A column containing the aforedescribed Dowex 2X8 basic ion exchange resin was prepared in the same manner as in Example 1. The resin column was washed with 100 ml. of distilled water, and the eluted water was discarded. Thereafter, the ion exchange resin column was treated with 100 ml. of a 15 percent aqueous solution containing a 90:10 mixture of glycine acid/iminodiacetic acid respectively. The resin column was then washed with a 100 ml. portion of distilled water. The 200 ml. effluent from the column was collected and, after evaporation to dryness, gave 11.4 g. of glycine having 97.7 percent purity.

Example 7

The iminodiacetic acid impurity retained on the ion exchange resin column in Example 6 was removed by washing the column with 100 ml. of a 5 percent aqueous sodium chloride solution which also simultaneously regenerated the ion exchange resin column. Thereafter, the eluant which contained the sodium salt derivative of iminodiacetic acid was acidified with hydrochloric acid, and the thus formed iminodiacetic acid was recovered using fractional crystallization. The purity of isolated iminodiacetic acid as determined by an N.M.R. analysis in $D_2O$ solution was about 90+ percent.

It is understood that the foregoing detailed description is given merely by way of illustration, and that many variations and modifications may be made therein without departing from the spirit of this invention.

What is claimed is:

1. A method of separating glycine from a solution containing glycine and iminodiacetic acid which comprises
    (a) treating an aqueous solution containing
        (i) glycine component selected from the group consisting of glycine, alkali metal salts thereof or mixtures thereof, and
        (ii) an iminodiacetic acid component selected from the group consisting of iminodiacetic acid, alkali metal salts thereof or mixtures thereof; with a strongly basic anion exchange resin of the quaternary ammonium type in the salt form, thereby retaining said iminodiacetic acid component on said resin; and
    (b) separating said glycine component containing solution from said anion exchange resin.

2. The method of claim 1 wherein the strongly basic anion exchange resin is a polystyrene divinyl benzene quaternary ammonium resin in the chloride form.

3. The method of claim 1 wherein said aqueous solution is passed through a column containing said anion exchange resin.

4. The method of claim 1 wherein said aqueous solution contains a mixture of glycine and iminodiacetic acid.

5. The method of claim 1 wherein said aqueous solution contains a mixture of glycine and monosodium iminodiacetate.

6. The method of claim 1 wherein said aqueous solution contains a mixture of sodium glycinate and disodium iminodiacetate.

7. The method of claim 1 further including the steps of removing said iminodiacetic acid component retained on said anion exchange resin, and thereafter recovering pure iminodiacetic acid.

8. The method of claim 1 wherein the iminodiacetic acid component is removed from said anion exchange resin by treating said resin with an aqueous sodium chloride solution.

9. The method of claim 1 wherein the solvent from said separated solution is removed to give a solid glycine product free of iminodiacetic acid.

References Cited
UNITED STATES PATENTS

| | | | |
|---|---|---|---|
| 2,819,303 | 1/1958 | Griffith et al. | 260—534 E |
| 2,239,617 | 4/1941 | Moore | 260—534 E |
| 3,153,668 | 10/1964 | Sexton | 260—534 E |
| 3,272,737 | 9/1966 | Hansen et al. | 260—534 E |

VIVIAN GARNER, Primary Examiner

U.S. Cl. X.R.

260—534 R